(12) United States Patent
Smithwick et al.

(10) Patent No.: US 8,976,323 B2
(45) Date of Patent: Mar. 10, 2015

(54) SWITCHING DUAL LAYER DISPLAY WITH INDEPENDENT LAYER CONTENT AND A DYNAMIC MASK

(71) Applicant: Disney Enterprises, Inc., Burbank, CA (US)

(72) Inventors: Quinn Y. Smithwick, Pasadena, CA (US); Mark Reichow, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 186 days.

(21) Appl. No.: 13/775,368

(22) Filed: Feb. 25, 2013

(65) Prior Publication Data

US 2014/0192281 A1    Jul. 10, 2014

Related U.S. Application Data

(60) Provisional application No. 61/848,475, filed on Jan. 4, 2013.

(51) Int. Cl.
  *G02F 1/1347* (2006.01)
  *G02F 1/13* (2006.01)
  *H04N 13/04* (2006.01)

(52) U.S. Cl.
  CPC .......... *G02F 1/1313* (2013.01); *H04N 13/0452* (2013.01); *H04N 13/0495* (2013.01)
  USPC ................................................ 349/74; 349/77

(58) Field of Classification Search
  CPC .............. G02F 1/1347; G02F 1/13471; H04N 13/0495
  USPC ........................................... 349/15, 74, 77, 83
  See application file for complete search history.

(56) References Cited

U.S. PATENT DOCUMENTS

| 6,232,938 | B1 * | 5/2001 | Tsuchida et al. ................. 345/88 |
| 7,394,506 | B2 * | 7/2008 | Cirkel et al. .................... 349/15 |
| 2011/0310121 | A1 * | 12/2011 | Baron ............................ 345/634 |
| 2013/0106923 | A1 * | 5/2013 | Shields et al. ................. 345/690 |
| 2013/0300728 | A1 | 11/2013 | Reichow |

* cited by examiner

*Primary Examiner* — Nathanael R Briggs
(74) *Attorney, Agent, or Firm* — Marsh Fischmann & Breyfogle LLP; Kent A. Lembke

(57) ABSTRACT

A dual layer display system for generating dimensional imagery. The system includes a first display device and a second display device with a light source. The second display device is arranged to be spaced apart from the first display device and to project output light onto a back surface of the first display device. The system alternatively operates the display devices in a first mode in which the first display device is transparent and the second display device displays back layer content and in a second mode in which the first display device displays front layer content and the second display device operates as a backlight to the first display device. In the first mode, the first display device displays a mask for the front layer content such as with gray-to-black pixels mapped to an object in the front layer content to block back layer content at this location.

28 Claims, 9 Drawing Sheets

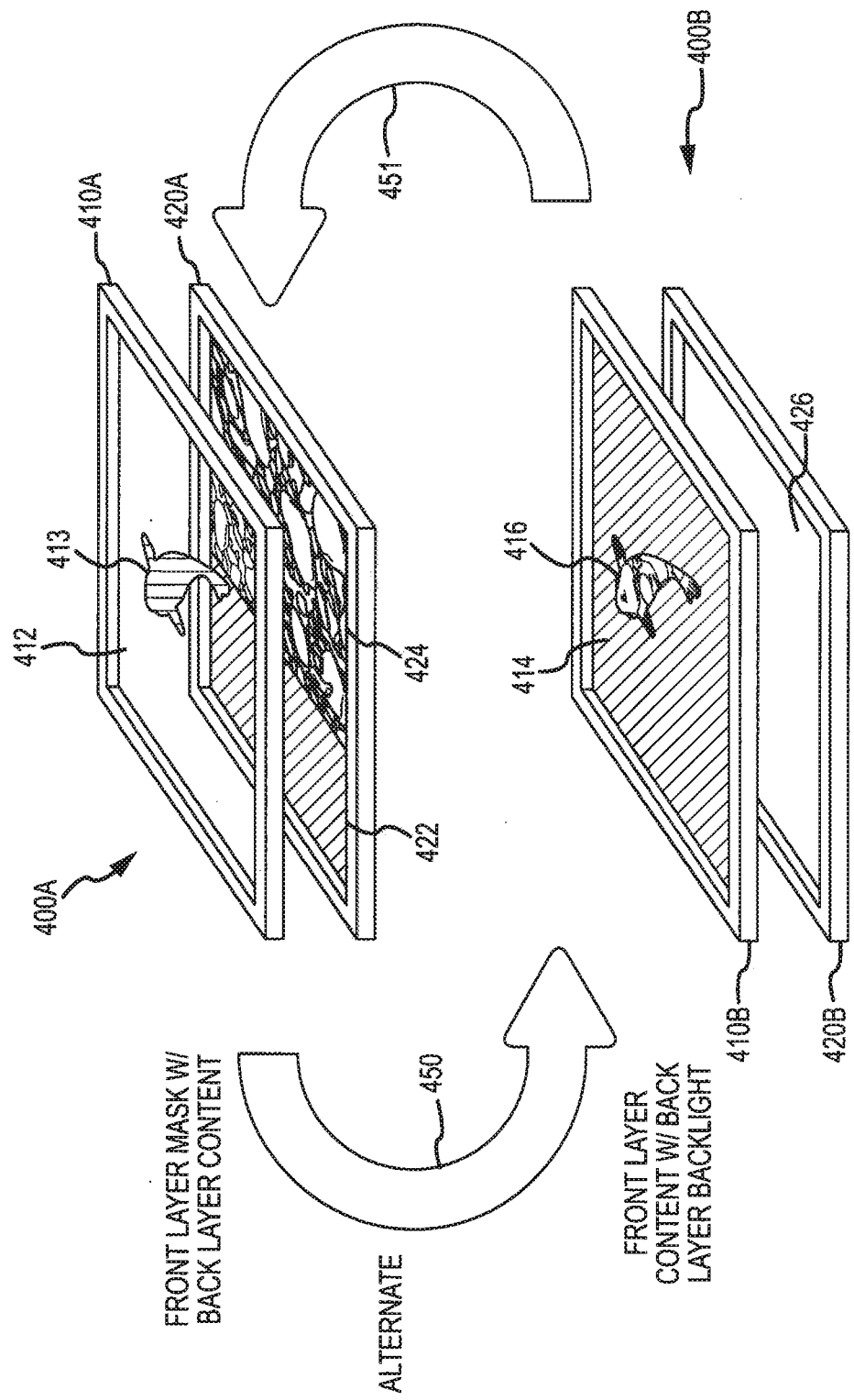

SWITCHING DUAL LAYER DISPLAY WITH INDEPENDENT LAYER CONTENT AND A DYNAMIC MASK

CROSS-REFERENCE TO RELATED APPLICATIONS

This application claims the benefit of U.S. Provisional Application No. 61/848,475 filed Jan. 4, 2013, which is incorporated herein by reference in its entirety.

BACKGROUND

1. Field of the Description

The present description relates, in general, to three dimensional (3D) image generation, 3D media, and 3D display devices and, more particularly, to systems and methods for producing 3D images or depth and space media illusions without requiring viewers to wear 3D glasses or the like, e.g., multiplanar display systems providing a 3D display to viewers rather than projecting stereoscopic images requiring a viewing technology such as particular 3D glasses to be seen by an observer.

2. Relevant Background

There is a continuous desire and need to provide new techniques that provide cost effective but eye-catching content with depth and dimension. For example, it is desirable to grab the attention of crowds in shopping malls, on busy streets, in amusement parks, and other crowded facilities such as airports and entertainment arenas. As discussed above, 3D imagery is one exciting way to appeal to viewers and hold their attention.

However, the use of 3D imagery has, in the past, been limited by a number of issues. Typically, 3D projection is used only in low light environments and is not particularly effective in applications where there is a significant amount of ambient light such as an outdoor venue during the daytime (e.g., an amusement park or athletic stadium in the morning or afternoon where conventional 3D video image projection cannot compete with sunlight). Further, 3D projection technologies generally require the viewer to wear special viewing glasses, which is often inconvenient for many applications and can significantly add to costs.

One way of providing 3D imagery without glasses has been through the use of dual layer displays as these devices provide a simple and effective technique for creating dimensional imagery. FIG. 1A illustrates, with a perspective view, one basic and exemplary implementation of a dual layer display 100 during operation to provide a dimensional display without requiring a viewer to wear 3D glasses or headgear. The display 100 is a stacked and spaced combination of front layer transparent LCD panel 110 and a back layer LCD monitor 120.

As shown in FIGS. 1A and 1B (with FIG. 1B being a top view when the stack is vertically arranged), the LCD panel 110 is operated to provide front (or upper plane) content 114 (e.g., a fish) while the LCD monitor 120 is concurrently operated to provide back (or lower plane) content 122, 124 (with content 122 being a dark background content and content 124 providing a lighter/brighter and contextual content (e.g., rocks at the bottom of a pond/aquarium)). The foreground content 114 and background content 122, 124 are physically separated in depth by the spacing between LCD panel 110 and LCD monitor 120. The resulting image stack 114, 122, 124 exhibits parallax and correct accommodation cues. Typical content includes planar foreground and planar background images or layered projections of a 3D object.

In the dual layer display 100, the transparent LCD panel 110 does not emit its own light. It acts, instead, as a programmable transparency or filter over the back LCD monitor 120. White pixels on the transparent monitor 110 are clear, black pixels are opaque, and gray pixels are semi-transparent (as are pixels of other colors). During use of the display 100, the front and back layers' images 114, 122, 124 combine visually in a multiplicative manner (e.g., color component-wise).

As a result, as can be seen in FIG. 1B, portions of the front layer content 114 that are over the black back layer content 122 are not visible to the viewer (or do not appear as part of the dimensional display/output). Likewise, color mixing between the content 114, 124 can cause portions of content 114 to disappear or not be visible (e.g., red portions of front layer content 114 are not apparent over green portions of back layer content 124). A further problem with dual layer display 100 is that with bright back layer content (portions of content 124) the front layer content 114 is dark, low contrast, and semi-transparent, e.g., back layer content 124 is visible through the front layer content 114, which is often undesirable as it may be desirable for content 114 to be opaque (viewer would not expect to see through a fish in water in the provided example).

In brief, the appearance of the front layer content is dependent upon the back layer's content in dual layer display. Further, the front layer content is view dependent because of parallax between the two layers. The content creator must, therefore, carefully compose the front and back layer content so that the images in these two layers of content do not visually interfere with each other (as was the case in FIGS. 1A and 1B). In more complex schemes, the content provided in front and back layers of the dual layer display visually interact intentionally to display an apparently smooth volumetric image rather than just basic planar objects on each layer. This additional gain is achieved, though, at the expense of field of view of the display and the need for careful alignment of the displays of the front and back layers. In some applications, this effect is desirable and worth such a tradeoff.

Some efforts have been made to try to make the objects in the front layer content of a dual layer display appear visible against dark back layer content (e.g., try to make content 114 visible over dark back content 122 in FIGS. 1A and 1B). For example, one technique is to place a white silhouette of the front layer content in the back layer content (e.g., provide a white backdrop to the content 114 in the portions 122 and 124 in display 100). The white silhouette acts as a localized backlight for the front layer content, and this technique also makes the front layer content appear opaque because part of the background content (that had previously shown through the front content) is removed to provide the white silhouette. The front layer content depends, therefore, (and is not independent from) upon the back layer content for visibility, opacity, and occlusion in such dual layer display systems.

While providing some improvements over prior dual layer displays, when viewed off-axis, the white silhouette on the back layer is no longer aligned properly with the front layer content. As a result, the silhouette can be seen by the viewer and may appear as a white halo on one edge of the front layer content (e.g., a white layer outlining the colored fish in the example of FIGS. 1A and 1B) and a dark and semi-transparent halo on the opposite side (e.g., portions of the front layer content may not be semi-transparent as was the problem with prior dual layer displays).

When viewed even further off-axis or by other viewers (not aligned perfectly with the display stack), the back layer silhouette and front layer content may be severely misaligned due to parallax such that the silhouette not longer properly serves its function (e.g., as a local backlight that also provides opacity). The front layer content/image would again appear as a transparency over the non-silhouetted background content and the silhouette hole in the background content would be readily apparent to the viewer. Disocclusion of the background is not possible with such a dual layer display as the previously hidden content does not exist (e.g., content removed for white silhouette). For larger depth separations between front and back layers, perspective effects also affect the quality of the display output. Another issue with such displays is that the silhouette only aligns with the front layer content at certain viewing distances.

Another approach used for dimensional displays involves depth fused displays, which are a class of layered displays that visually blend the layers to present an image volume rather than a stack of planar images. To increase the apparent number of layers, depth-weighted blending may be used in depth fused displays. Virtual pixels can be placed at depths between the layers by splitting the virtual pixel's luminance between the front and back layers proportional to its depth. The front and back layer content visually combine additively when the depth fused display is operated, and the viewer will accommodate on the virtual layer. For slight off-axis viewing, there is generally correct parallax and disparity.

There are several ways to implement a depth fused display including use of beam-combined LCDs, multiple scrim projectors, and two or more layers of stacked liquid crystal cells. Many of these displays can be used as dual layer displays with stacked planar images, and only the content needs to be changed to display depth fused images. A depth fused display uses two (non-transparent) LCD monitors that are optically combined using a 45-degree half-silvered mirror (also known as a beam combiner). The reflection of one display in the mirror appears stacked and spaced in front of (or behind) the direct view of the other display. Each layer is emissive, and the layers visually combine additively (color componentwise) because they are combined by the half-mirror. White pixels of the reflected monitor are bright, black pixels are transparent, and gray pixels are semi-transparent (as are other-colored pixels).

Other depth fused displays use two scrims stacked and spaced apart, with two projectors projecting front and back layer content onto the appropriate scrim. The two layers also visually combined additively. Unfortunately, the front and back layers have content that is semi-transparent and low contrast. A compact version of a depth fused display may use a stacked and spaced combination of a front transparent LCD without a polarizer and a back LCD monitor without an analyzer. Depth fusion in such a display is the result of the additive combination of the polarization rotation angles between the two displays, which appears as if the luminances of the two layers are added. In another implementation, the display is composed of a transparent emissive layer (e.g., an edge lit scattering plastic) between the front transparent LCD panel and rear LCD monitor. The transparent emissive layer backlights the front transparent layer, which visually combines additively with the hack layer.

Depth fused displays provide some advantages in providing a dimensional display to viewers without the need for glasses, but the disadvantages have blocked widespread implementation or use. For example, depth fused displays tend to have small fields of view due to parallax creating too large a misalignment between the two layers. Increasing the number of layers increases the field of view but adds to cost and complexity. Depth fusion also fails when the two layers are too far apart as the viewer cannot properly fuse the content provided at the differing depths. This may even occur for smaller layer separations such as when the display is viewed from a viewing distance that is too small (e.g., the viewer inspects the display close up).

Another approach to providing dimensional content is to use multilayer displays that include multiple image planes, e.g., foreground, midground, and background planes. Typically, multilayer displays are operated to produce volumetric images of 3D objects by placing cross sections of the object at each layer. The use of multiple layers provides smoother looking objects (with or without depth-weighted blending) and a larger field of view for apparently opaque objects than dual layer displays. In one particular such display, the display includes a spaced stack of twenty liquid crystal shutter panels and a high speed projector. Each shutter panel is operated to be transparent and scattering in sequence with the appropriate image projected for that one scattering layer. This implementation may also use anti-aliasing, which is a form of depth-weighted blending, to smooth the transition between layers.

In an early attenuation multilayered display, a stack of transparencies was used with each providing a cross section (or small depth of field image) of an object so as to create a volumetric image. Modern attenuation multilayered displays use multilayered LCDs and optimally compute the attenuation of each display (e.g., treating each LCD as a programmable attenuator) via tomography (i.e., integrated attenuation along a light ray path through the volume) to produce the desired light field (e.g., multiview images) emitted by the display. Unlike depth-weighted blending, tomographic methods do not require depth maps to be computed. Similar to depth-weighted blending, though, the field of view in multilayer displays is limited. Some efforts have been made to overcome this problem by using a switching directional backlight to allow multiple tomographic projections to be displayed in sequence with each projection only visible from a limited view.

In some display systems, floating images are provided in layered displays. For example, a display system may use varifocal optics to relay real images of a high-speed, selectively backlit transparent monitor at different depths. Such a display exhibits correct accommodation and vergence cues of up to twenty-four floating layers that the user/viewer can interact with during operation of the display. Multiplanar images have also been created using such a varifocal-based display as well as 3D hulls of objects. For occlusion capability, the varifocal display's monitor may be replaced with a multiview integral display whose real image is optically scanned in depth.

Floating images may also be provided using an immaterial depth fused display to project images onto layered fog screens. The use of a non-solid screen allows the viewers/users to interact with both layers. Infrared (IR) cameras may be used to track a single user to ensure the layers are visually overlapping correctly as the user moves. Additionally, the designers of depth fused displays and attenuation multilayered displays have reported the ability to have layers float outside the stack of LCD layers. The latter method produces different images in different view zones to create a stereoscopic image of the floating layer. However, while providing interesting imagery, these floating layers are not composed of real focused/scattering points of light at different depths, and, hence, the displays likely do not have correctly coupled accommodation and vergence cues for a realizable number of view zones.

Additionally, in modern interactive applications, the display device is increasingly used as an input device, e.g., a touch screen, gestural interfaces, and the like. The dual layer display is undesirable in such applications because a user would likely want to interact with content on both layers. However, the back display is physically inaccessible to the viewer/user as the solid front screen prevents the user from touching the back screen.

Hence, there is a need for a display assembly or system that produces solid, high-contrast front layer content or images that is independent of the back layer content/images being concurrently displayed. The system/assembly preferably would have a wide field of view and be simultaneously viewable by multiple people or viewers. Further, the display system/assembly would preferably be capable of producing a floating, real-image front layer so that the user/viewer can interact with both layers of the displayed imagery/content. The floating front layer may be capable of occluding the back layer content, exhibit appropriate parallax between layers, and also provide natural accommodation cues to the viewer. Additionally, some implementations of the display system/assembly may include an ability to display smooth volumetric images, and the display system/assembly may be extensible to multiple layers (rather than only two layers) while maintaining the aforementioned desirable qualities.

SUMMARY

Briefly, to address these and other needs, a multi-dimensional display assembly or system is provided that includes a switching dual layer display combined with a dynamic mask (e.g., a liquid crystal display (LCD) mask or the like). The description also provides a unique method of operating the display to achieve a desired multi-dimensional display or effect. The display assembly is capable of or adapted for providing independent layer content and for providing occlusion between the layers of the display assembly. The dual layer display portion includes a spaced stack of a transparent LCD panel (e.g., emissive display device providing a front layer) and an LCD monitor (providing a back layer) synchronously switching between content, mask, and backlight states.

During operations (performing the display method of the description), in a first state, the back layer displays white and the front layer displays its content. Hence, the back layer acts as a backlight for the front layer, which makes the front layer's content visible to a viewer. In a second operating state, the back layer is operated to display content and the front layer is operated to display a mask (designed for and/or configured for the back layer content). In this second state or step of the display method, the back layer content is occluded by the front layer's mask.

Rapidly alternating or switching (e.g., with a system controller) between states (and the displayed content and corresponding masks) causes a viewer to perceive opaque, high-contrast foreground content that occludes the background content. Besides multi-plane (or multi-dimensional) imagery, the display assembly provides depth blending using opacity that allows for smooth 3D volumetric imagery at the cost of a reduced field of view. In some embodiments, the display system or assembly may further include a relay mirror and a phantom mask that allows solid appearing front layer content to optically float above and occlude the back layer content. The floating front layer content is non-physical such that both display layers are accessible for interactive applications or portions of an operating method for the display system/assembly.

In other words, the inventors propose and teach a switching dual layer display with a dynamic mask. The display is operated to provide high-contrast front layer content (or images/imagery viewable by a viewer) with programmable opacity that is independent of the back layer content. In addition to discrete planes, apparently smooth volumetric objects may be displayed using opacity-based depth blending between layers. The display described herein is also capable of displaying a floating front layer whose content may also selectively occlude the physical back layer. Further, a multilayer extension or embodiment is also taught in the following description.

More particularly, a switching dual layer display system is provided that is operable to create a dimensional display without requiring viewers wear special glasses or headgear. The system includes a first display device and a second display device with a light source. The second display device may be arranged so as to be spaced apart from the first display device and to project output light onto a back surface of the first display device. For example, the first display device may be a transparent liquid crystal display (LCD) and the second display device may be an LCD monitor. The system further includes a display controller that first operates the first and second display devices in a first mode in which the first display device is transparent and the second display device displays back layer content and second operates the first and second display devices in a second mode in which the first display device displays front layer content and the second display device operates as a backlight to the first display device.

In practice, the display controller may switch rapidly between the first and second operating modes in a synchronized manner such as at a rate whereby the first layer content and the back layer content are each displayed at 60 Hz or faster. The system may be implemented such that, in the first mode, the first display device displays a mask made up of a white region and a gray-to-black region mapped in size, shape, and orientation to an object in the front layer content displayed during the second mode. For example, the back layer content may include a colored object, and the mask is transparent to the colored object in the white region and is semi-transparent-to-opaque to the colored object in the gray-to-black region. Further, in some applications, the mask is created with a plurality of black pixels in the gray-to-black region, whereby the mask occludes light from the back layer content with the gray-to-black region.

In some implementations of the system, the second display device is or includes a projector. In other embodiments, the second display device includes a switchable transparent backlight. In such embodiments, the switchable transparent backlight may include at least one of edge-lit plastic (or plastic panel, sheet, or the like), an LCD, and an area-flooded smart glass. In some cases, it is desirable to provide a multilayer 3D output with the viewer wearing glasses, and, in such cases, the front layer content may include a first anaglyph image for a first one of the left or right eye and the back layer content may include a second anaglyph image for a second one of the left or right eye. In some other embodiments, the second display device includes a transmissive display and the light source includes a directional backlight providing substantially collimated light sequentially in one of three directions to sequentially illuminate three areas of the first display device and the transmissive display of the second display device. In these embodiments, the system may be selectively operated to provide two or more view zones and/or may be selectively operated to provide opacity depth blending to increase the field of view.

According to another aspect of the present description, a display system is taught that operates to provide floating content. The display system includes a transparent display device and a relayed display device spaced apart from the transparent display device. Further, the display system includes relay optics positioned between the transparent display device and the relayed display device. Then, during a first operating state, the transparent display device is operable to display white to be transparent to light from the related display device and the relayed display device is operable to display foreground content. Further, during a second operating state, the transparent display device is operable to display background content and the relayed display device is operable to display a mask corresponding with the foreground content.

In such a display system, the transparent display device may be a transparent liquid crystal display (LCD) and the second display device may be an LCD monitor. In some implementations, the relay optics may include a concave mirror, a Fresnel lens, a concave mirror with a beamsplitter, a dihedral mirror array, a double fly-eye array, or a retroreflector with a beamsplitter. While in the same or other implementations, the system may also include a display controller switching between the first and second operating states at 60 Hz or faster.

The display system may also include a sensor sensing interaction with a floating image associated with the foreground content at a distance from the transparent display device and a projector operable in response to the sensed interaction to project the foreground content toward the transparent display device. In such a display system, the sensor may include or use an infrared (IR) depth camera monitoring the sensed interaction through the transparent display device (e.g., through a transparent LCD or through an LCD panel).

BRIEF DESCRIPTION OF THE DRAWINGS

FIGS. 4A and 4B are perspective and top views, respectively, of a switching dual layer display system during switching operations similar to those of FIGS. 3A and 3B but with the addition of a dynamic mask in the front layer content during operations of the back layer display device to display its content/imagery (not simply to act as a backlight)

DETAILED DESCRIPTION

Figure 1A:
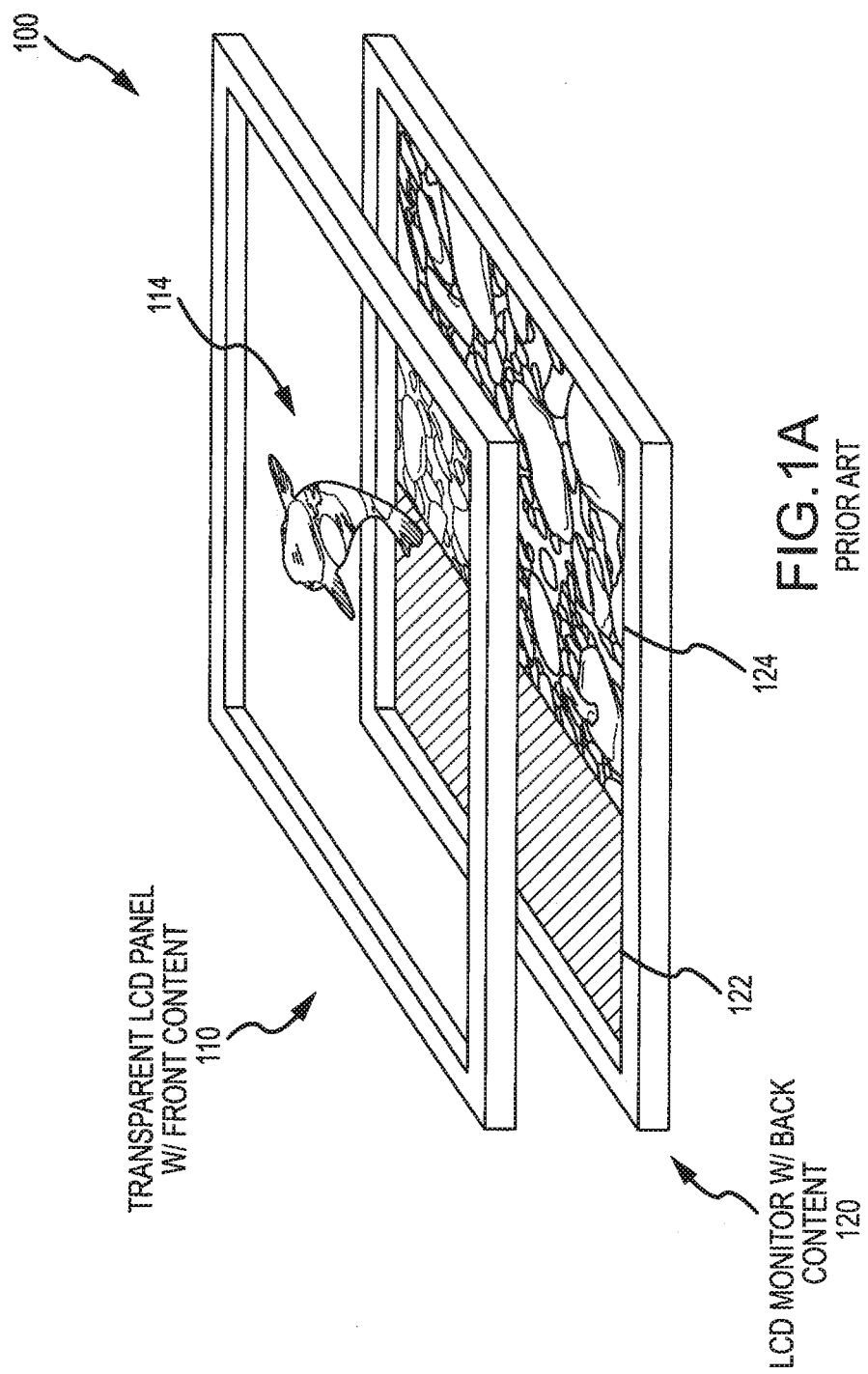
FIGS. 1A and 1B are perspective and top views, respectively, of a convention dual layer display during operation to provide a 3D or dimensional display.
Figure 1B:
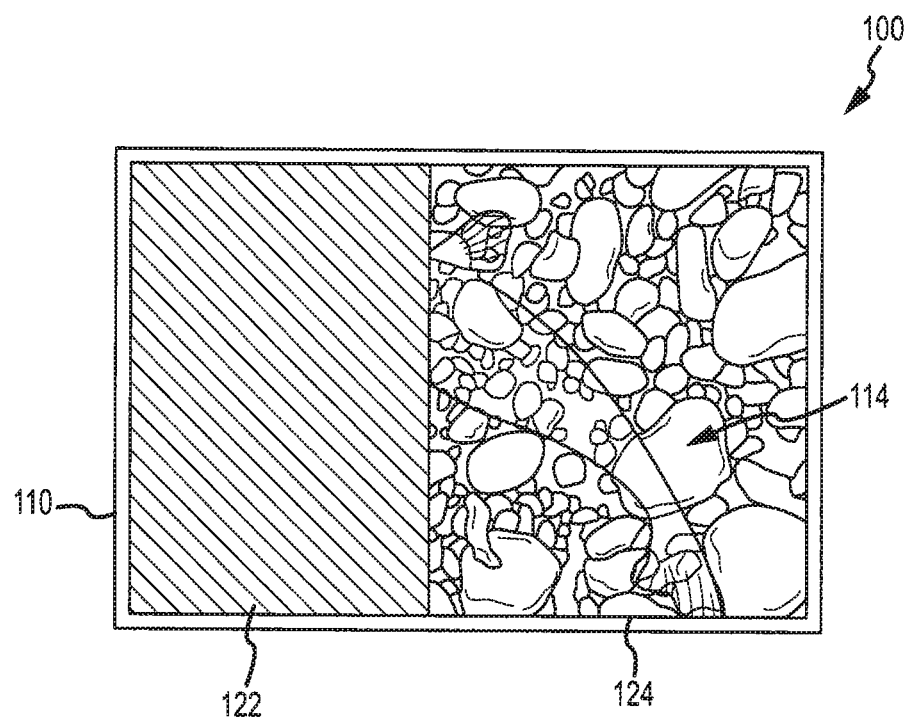
Figure 2:
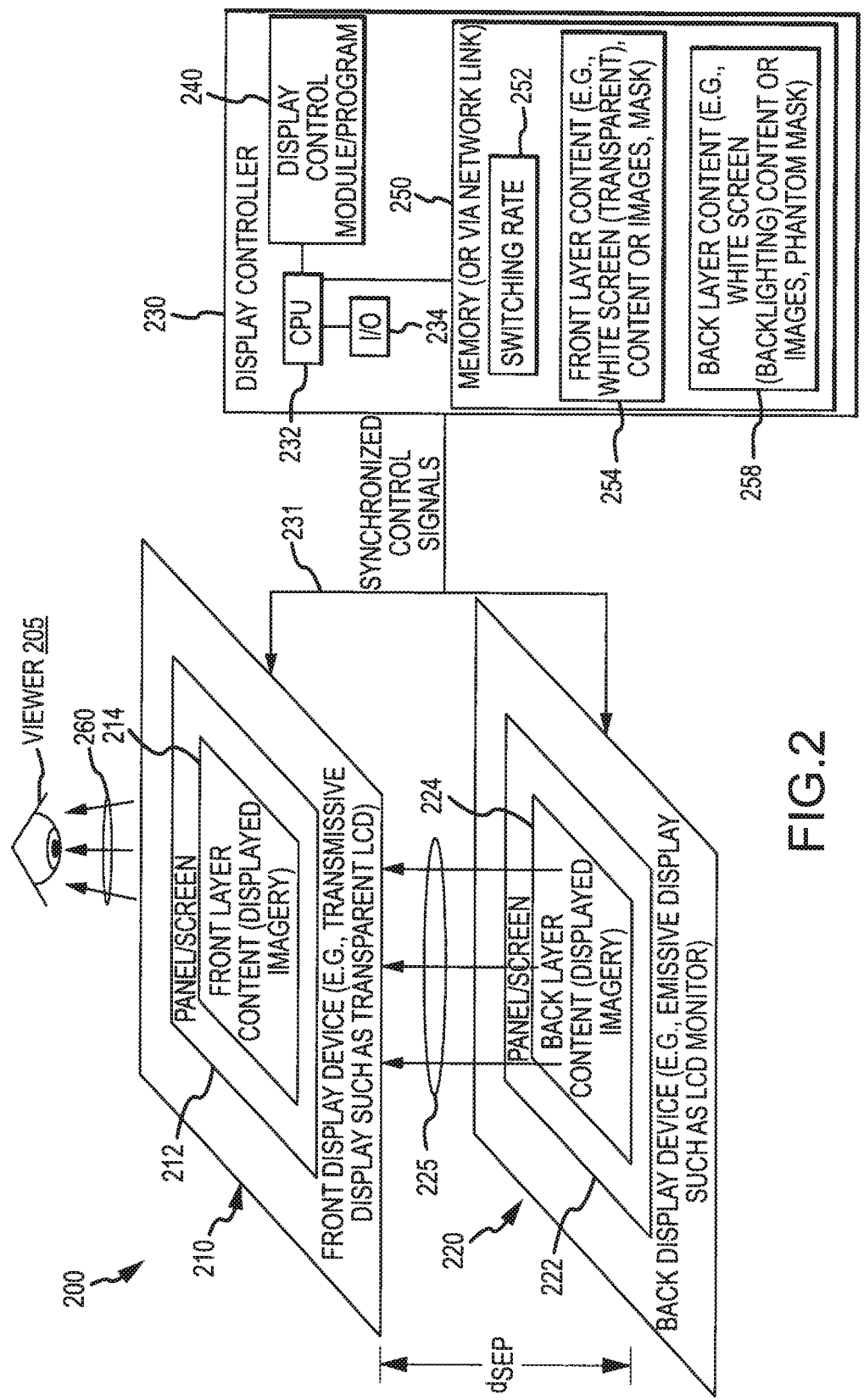
FIG. 2 is functional block diagram of a switching dual layer display system of an embodiment of the present description.

As shown in FIG. 2, a 3D or multi-dimensional display system or assembly 200 is provided that is useful for implementing the concept of a switching dual layer display with independent layer content and a dynamic mask. The display system 200 is shown in functional block form during operation to provide an output (light) 260 visible by a viewer 205. The viewer 205 may move their head to change their viewing angle and also change the viewing distance by moving relative to the display system 200, and these changes and movements do not ruin the effectiveness of the output/display 260 in providing a 3D or multi-dimensional visual effect.

As shown, the display system 200 includes a front display device 210 that is paired with a back display device 220. The display devices 210, 220 may be arranged in a stacked manner with their panels/display screens 212, 222 in a parallel arrangement (or near parallel) and aligned to be fully or at least partially overlapping. For example, the screens 212, 222 may be rectangular in shape and be selected to be about the same size, and the front screen 212 may be positioned to fully (or nearly so) overlap or cover the back screen 222. In other cases, though one of the screens 212, 222 may be of a different size or shape to practice the display system 200. To provide depth or dimensionality to the viewed output/display 260, the two display screens 212, 222 are separated by a typically fixed distance, $d_{Sep}$, which may range from less than an inch to, more typically, several inches to two feet or more.

The front display device 210 may be a transmissive display such as a transparent LCD or light modulator that can be operated to provide or display front layer content 214 with or in panel/screen 212 when it is backlit with light 225 from the back display device 220. The front layer content 214 may be all white pixels such that the front display device 210 is transparent, and, in such a state, all of the light/display 260 would be provided by the back layer content 224 from back layer panel or display screen 222. The front layer content 214 may also include content or images that may be visible in output 260 by viewer 205 (as discussed further below). Further, the front layer content 214 may include a dynamic mask formed with or made up of black (or dark colored) pixels in screen 212 that block back layer content 224.

The back display device 220 may be an emissive display such as, but not limited to, an LCD monitor that is useful for providing backlighting as well as content/imagery in its output light 225. The output light 225 is provided via the panel or display screen 222 and is shown to provide back layer content or displayed imagery 224, which may include white light (backlighting for front display screen 212 and content 214), back layer content or images, and/or masks (to enhance the 3D or dimensional output 260 provided to viewer 205).

The display devices 210, 220 are operated in an alternating or switched manner by a display controller 230, which issues or generates time-synchronized control signals 231. In a typical implementations, only one of the two display devices are used to provide content or images at one time while the other display device may be providing backlighting (white pixels in the panel or screen 222) or masks (e.g., black pixels of a particular shape and size in the front layer content 214 provided by the front panel or screen 212). The concurrent and switching operating states are controlled by the signals 231 with a pair of corresponding signals 231 sent out concurrently to the display devices 210, 220.

The display system 200 is shown to include a display controller 230 that may include a processor 232 for executing program or computer code to perform the functions described herein (including generating control signals 231). For example, the controller 230 may take the form of a computing device with the processor 232 operating to execute a display control software module or program 240 to operate the display devices 210, 220 in a switching manner to display content 214, 224 to viewer 205 in output light 260. This may cause the controller 230 to generate control signals 231 based on a switching rate 252 stored in memory 250 (or accessible over a network via wired or wireless communications). The switching rate 252 may be a default value or be set/adjusted by an operator of the controller 230 via input/output (110) devices 234 (e.g., a keyboard, a graphical user interface (GUI) in a monitor, a mouse, a touchscreen, voice controls, or the like). In some cases, the control signals 231 are generated such that each layer content 214, 224 is displayed at 60 Hertz (Hz) or another switching rate (from one operating state to another as discussed below) to limit or avoid flicker that is perceptible in output 260 by viewer 205.

The display control module program 240 may also retrieve the front layer content 254 and back layer content 258 from memory 250 (or it may be provided via a network link to controller 230) and selectively provide this content 254, 258 in the control signals 231 to the front and back display devices 210, 220. For example, the control module 240 may generate the control signals 231 so as to play the content 254, 258, which may cause each device 210, 220 to be operated in a switching manner (as described further below).

The front layer content 254 may be configured or designed to provide content 214 that is made up of white pixels to make panel/screen 212 transparent, to provide content 214 that includes content or images that are included in output 260 for viewing when the screen 212 is backlit 225, or to provide a dynamic mask in content 214 (e.g., a set of black pixels of a desired shape and size to block content 224 in light 225 from being visible in output 260). The back layer content 258 may be configured or designed to provide content 224 that is made of white pixels to backlight, screen 212 with light 225, to provide content 224 that includes content or images that are visible in output 260 as being on the plane/layer of screen 222 by the viewer 205, or to provide phantom masks (explained below) content 224.

Prior to further talking about particular implementations and operating methods for switching dual layer displays, it may be useful at this point in the description to more generally discuss the inventors' ideas for providing improved 3D displays without the need for 3D glasses. The inventors propose a dual layer display with independent layer content, and the proposed display provides high-contrast front layer content with programmable opacity that is independent of the back layer content. The front layer content or output imagery can also be made to float above the back layer. This would allow content developers the freedom in media content, layout, and interface when using these dual layer displays to produce dimensional interactive content. For example, it will help solve current media design issues related to backlighting a front transparent display.

The dual layer display described herein can provide independent layer content with a dynamic mask. Such an implementation may be provided with two stacked LCD panels, e.g., a back layer LCD monitor and a front layer provided by a transparent LCD panel. The layer content is time multiplexed using a monitor and a transparent panel with fast refresh rate and response time (e.g., less than 2 ms response time and 120 Hz refresh rate). In this regard, refresh rates are how many frames per second displays (could be interpolated in the display in fast motion scenes) while response time is how long it takes to go from one gray to another such as black to white. Hence, it may be desirable to provide a 120 Hz or higher refresh rate and at least about 5 ms refresh times.

The back layer LCD monitor is operated to alternate between displaying content/imagery associated with this back display plane of the dimensional output and displaying white so as to act as a backlight for the front layer display. The front layer transparent LCD panel synchronously alternates between transparent (to allow back layer content/imagery to be observed by a viewer) and displaying the front layer content/imagery associated with this front display plane of the dimensional output. With the advent of 3D capable LCD displays refreshing at 120 Hz or more and with 2 ms response times, the switching time between content and backlight can be chosen to be fast enough to minimize or avoid flicker. This dual layer display produces front layer content in its output that is visible over black back layer content, but the front layer content/images still may appear low contrast and semi-transparent over visible back layer content/output. The front and back layer content are not independent, yet (since the front layer cannot appear opaque until the mask is added).

The dual layer display may also be operated to provide a dynamic mask to enhance the 3D display/output. In this regard, the front layer content can be made opaque and independent of the background. To achieve this, the back layer may still alternate between backlighting and content/images while the front layer now alternates between content and a mask (white pixels to provide transparent regions but also black/dark pixels to provide a dynamic mask). The front layer mask blocks a portion of the background content (e.g., that associated with an image/content of the front layer) and provides a black/dark level for the front layer content/image when it becomes visible (when the dual layer display is switched to display such content/image in the front layer display). For two discrete layers, the time multiplexing of content and backlight/transparency provides two independent layers of high contrast 2D content with variable opacity of the front layer that is viewable by many observers over a wide field of view (e.g., as a 3D or dimensional output including images on two spaced apart display planes).

Depth blending may also be provided in some operations of the dual layer display. For a displayed 3D object whose depth spans both layers, the object would appear to be separated into two cross sections, with one cross section on each layer of the dual layer display. Using depth blending, the 3D object can be made to appear to be continuous in depth but viewable over a reduced field of view. Virtual pixels can be placed at depths between the layers to increase the apparent number of layers. This is accomplished by splitting the virtual pixel's brightness between the front and back layer display devices based on depth. For example, to place a virtual white pixel a quarter of the distance from the back layer to the front layer, a seventy-five percent gray pixel is displayed on the back layer and a twenty-five percent gray pixel is displayed on the front layer.

Real images may also be provided by operation of the switching dual layer display. Particularly, it is possible to make one layer (or its displayed content) float above the other such that the viewers may pass their hands through (or otherwise interact with) the floating layer to touch (or otherwise interact with) the layer behind it. This can be used to allow the viewers/users of the display to interact with the entire 3D volume rather than only the front surface. When the back display is showing foreground content and the front display is clear/transparent, the dual layer display may optically re-image or relay the back display through the front display using, for example but not limitation, a Fresnel lens. The back display will then float out in front of the front display, and the viewer/user can pass their hand through the virtual back display to touch the real front display. Alternatively, a depth camera (e.g. a Kinect) may sense the distance of the viewer's hands to either the transparent display or the floating content, allowing touch or hover interaction with the background or foreground content. The depth camera may be placed in front of or behind the screen. IR-based depth cameras may be placed behind the screen and still sense depth because LCD panels are transparent to IR light, regardless of the displayed content.

Then, the display may switch modes so that the back display now shows white with a black mask ("phantom mask") of the foreground content (or an image in the foreground). The light passes through the Fresnel lens and acts as a backlight for the front display showing background content. The black mask will appear as an opaque floating "phantom" (black object) above the background content, and the viewer can look around the phantom to see the background images/content but cannot see through it. When the display is operated to rapidly alternate between these two operating modes states, the viewer can perceive opaque high-contrast foreground content floating above the background content. The viewer may then pass their hand (or otherwise interact with) through the floating foreground content (e.g., the image of the back display) and touch the background content (e.g., the image of the front display). There can also be a touchscreen on the physical front display to add interaction. Such a touchscreen could be a dual self/mutual capacitive type, e.g., a TrueTouch® screen distributed Cypress Semiconductor Corp. or the like, that allows both touch (on the screen) and hover (a distance above the screen) sensing. With this type of touchscreen, the viewer can independently interact with the floating image of the back display or its screen with hover interactions and with the front display or screen with touch interactions.

With the switching dual layer display system 200 of FIG. 2 understood, it may now be useful to discuss a number of operational embodiments of such a display system to provide unique and visually pleasing dimensional displays for a viewer. In these discussions, a number of operations or functions are discussed that would be performed by a controller, such as display controller 230, but the controller and control signals are not shown for ease of explanation. For example, it will be understood in light of FIG. 2 that a display controller or similar device would be controlling switching of the displays and controlling what content is provided on each display (e.g., when a front layer display is transparent (white pixels) and when it is showing front layer content/images or a mask of the back layer content).

Figure 3A:
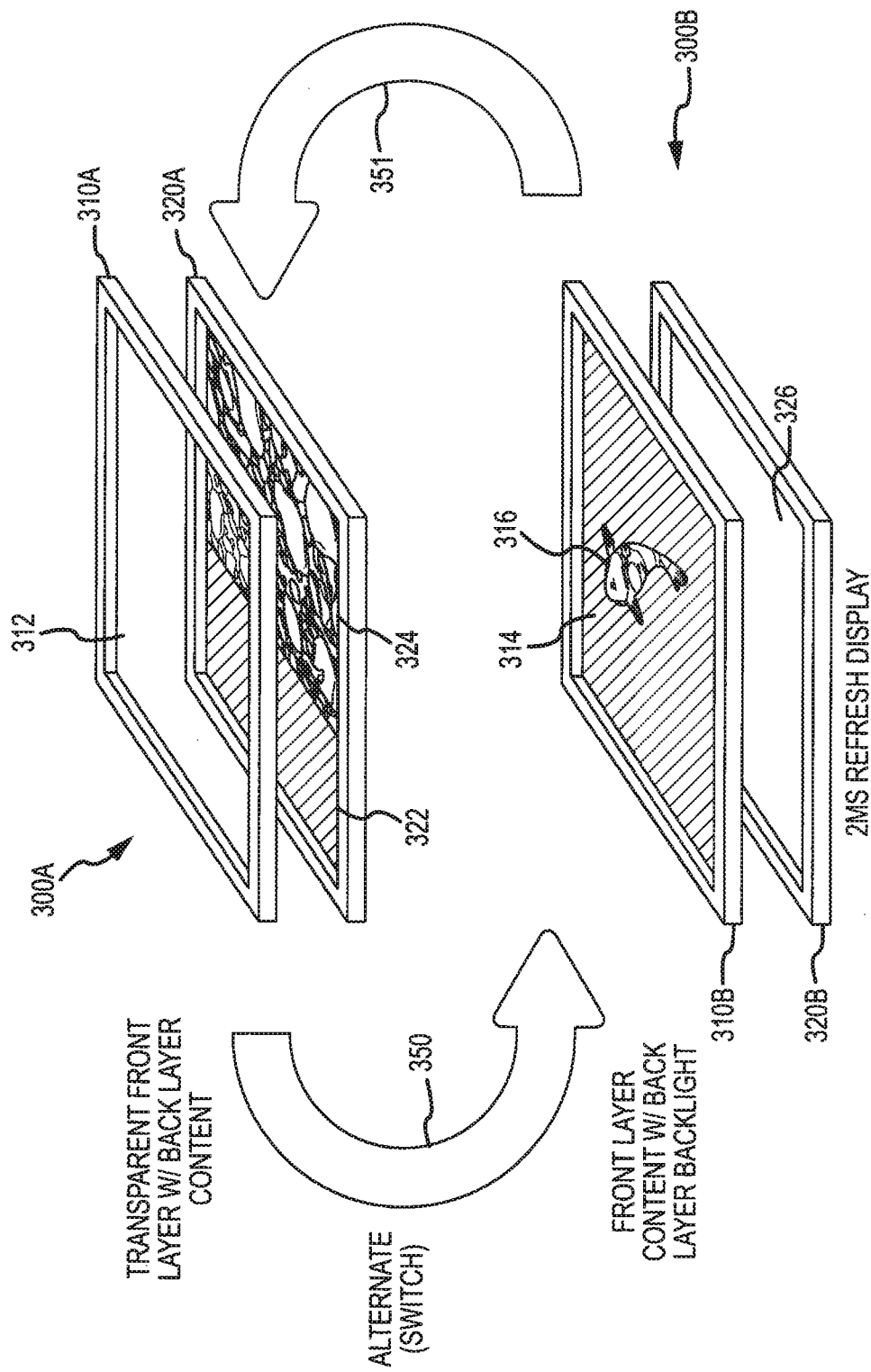
FIGS. 3A and 3B are perspective and top views, respectively, of a switching dual layer display system during switching operations to provide a dimensional display (see FIG. 3B for the image observed by a viewer observing the stacked displays)
Figure 3B:
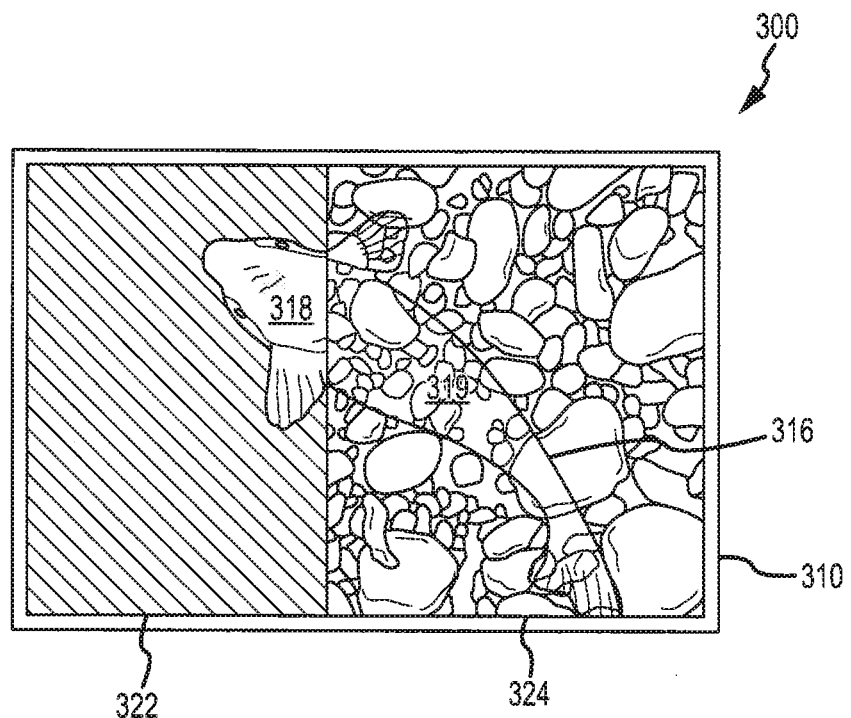

FIG. 3A illustrates a dual layer display system 300A and 300B during switching of its operational state (first state shown at 300A and second state shown at 300B), and FIG. 3B shows a top view of the dual layer display system 300 (of FIG. 3A) when rapid switching (e.g., at a high enough rate, such as 120 Hz, to avoid flicker) is employed. In other words, FIG. 3A provides a first snapshot or freeze frame of the display system 300A at a first operating state and a second snapshot or freeze frame of the display system 300B at a second operating state. A display controller (not, shown) alternates or switches rapidly (such as at a rate of up to 240 Hz or higher) between these two states 300A, 300B to provide the display system 300 shown in FIG. 3B.

The switching dual layer display 300 is provided with two stacked and spaced LCDs 310, 320 with the lower layer being an LCD monitor and the upper layer being a transparent LCD. The layer content is time multiplexed using displays 310, 320 with fast refresh rates (e.g., more than or equal to 120 Hz). The two display devices 310, 320 sequentially, oppositely, and synchronously alternate, as shown with arrows 350, 351, between content and a white image/pixels (transparency).

In the first state of operation of system 300A in FIG. 3A, the back layer display device 320A is operated by a controller to display content made up of a black/dark portion or region 322 and a brighter/image portion or region 324. Concurrently or during this first state, the front layer display device 310A is operated by a controller to be transparent (displaying white as shown at 312 throughout its screen or panel) to light from the screen of device 320A. In this operating state of display system 300A, the back layer content 322, 324 is visible to a viewer viewing both display devices 310A, 320A as shown at FIG. 3B (display device 320 or its screen is visible through the display device 310 or its screen/panel as it displays white).

In the second state of operation of system 300B in FIG. 3B, after the display switches 350, the back layer display device 320B is operated to display white as shown at 326 (to provide a backlighting of display device 310B) and the front layer display device 310B is concurrently operated to display content made up of a dark or black portion or region 314 and a color/lighter image 316 (a fish in this example). The back layer device's screen or panel 326 displaying white acts as a backlight for the front layer display device 310B, and the front layer's content/imagery 316 is visible to a viewer of the stack/dual layer system 300 as shown in FIG. 3B.

As can be seen in FIG. 3B, the lighter object or portion 318 of the content 316 can appear in the display output over a black back layer region 322, but the front layer object or portion 319 over the brighter back layer content (here rocks or a river/lake bottom) 324 still appears low contrast and semi-transparent. With the advent of 120 Hz 3D capable LCD displays for use as devices 310, 320, each layer can be displayed at 60 Hz, e.g., at a rate fast enough to avoid flicker. FIG. 3B is useful for showing that the stacked display devices (e.g., LCDs) 310, 320 combine additively.

The inventors implemented or prototyped a switching dual layer display system (e.g., implemented system 300). In the particular implementation, the dual layer display was constructed using two 55-inch 3D-capable televisions with 2 ms response times (e.g., 3D TVs produced and/or available from Samsung such as the UN55C7000 or the like). One television was made into a transparent display device for use as the front layer display device of the system by removing its backlight, framing it, and positioning it a desired separation distance (such as 7 inches) in front the other 3D-capable television.

With a display controller, the system was operated by providing foreground imagery (swimming koi) and background imagery (rock bottom in water) that were computer generated (CG) and rendered separately each at 1280 by 720 resolution. The foreground image/content (e.g., the swimming koi) was designed to be mostly white in color with red and black patches. The foreground image was displayed on the front television (transparent display device) while the background image was displayed on the rear television, in a time multiplexed or switching manner. As discussed above with regard to FIGS. 3A and 3B, the koi/foreground image or content may be positioned half over the dark background and half over the light background (background or back layer content). This results in the foreground or front layer content over the dark background appearing opaque with high contrast while the foreground or front layer content over the lighter background appears low contrast and semi-transparent.

To control operations of the dual display devices, the two displays/televisions were set to frame sequential 3D mode. The CG rendered movies providing front and back layer content were tiled together into a 2560 by 1440 resolution movie, e.g., using Adobe® Premier® or the like. The resulting movie is played (e.g., using Bino, an open-source stereoscopic video converter and player, on a Dell® or other computer with a triple head NVIDIA Quadro 2000 or other graphics card, with each of the two heads connected to one of the televisions/layer display devices of the dual layer display system.

In practice, the Bino program (which may considered part of the dual layer display control module) takes the 2560 by 1440 movie, considers it an over-under double-wide 3D movie, and converts it to a quad-buffered frame-sequential double wide movie output across the two televisions/display devices (e.g., the left side is displayed on the front television/ front layer display device and the right side is displayed on the back television/back layer display device).

For one frame, the top half of the over-under movie is displayed, with the left side of the double wide image containing the foreground content and the right side containing a white blank field. The back television displays the white image, acting as the backlight for the transparent front television displaying the foreground content. For the next frame, the bottom half of the over-under movie is displayed, with the left side of the double wide image containing a white blank field and the right side displaying background content. The front television displays the white image making it totally transparent to the back television displaying the background content. The two frames were repeatedly alternated or switched at 120 Hz.

Figure 4B:
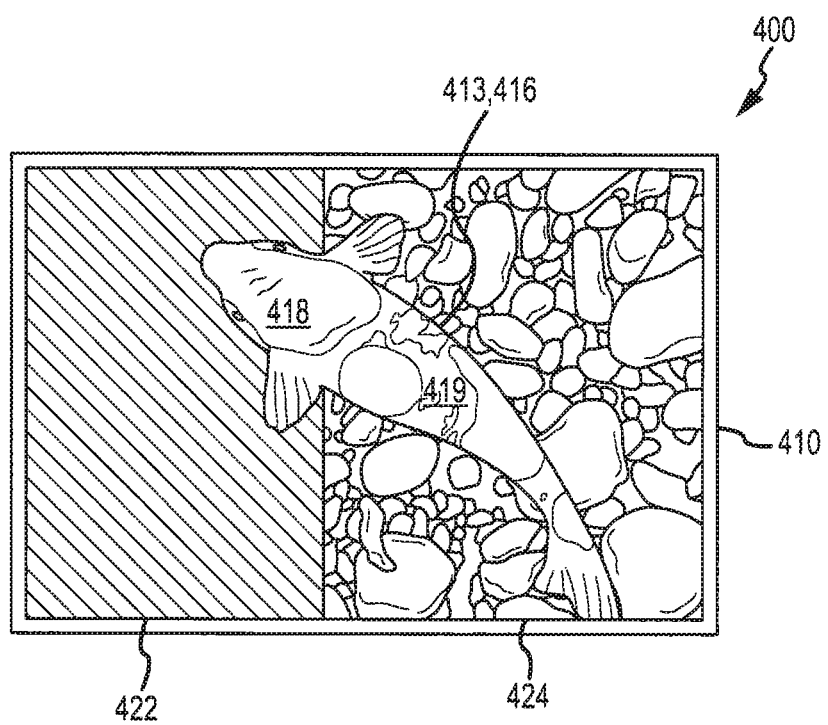

To address issues with the front content being low-contrast and transparent when switched with bright/colored content/images in the back layer, FIGS. 4A and 4B illustrate a switching dual layer system 400 that is operable to provide a dynamic mask in the front layer content to block select portions of the back layer content that are mapped to or correspond in size, location, and shape to the content/images of the front layer (e.g., a fish in the illustrated example). This may be considered a front layer mask embodiment or operating process for switching dual layer display system.

The results of implementing such a dual layer display system with switching content showed that the white body of the koi (foreground content, image, or object) appeared over a dark background. Further, though, the koi (foreground image) still appeared semi-transparent and relatively low contrast over the light background. However, the switching dual layer display system taught herein is more compact than a beam splitter-type dual layer display because the switching dual layer display system only occupies the volume of the stack while a beam splitter type display requires the space for the 45-degree, half-silvered mirror (or other beam splitter) and arranged monitors.

FIG. 4A illustrates a dual layer display system 400A and 400B during switching of its operational state (first state shown at 400A and second state shown at 400B), and FIG. 4B shows a top view of the dual layer display system 400 (of FIG. 4A) when rapid switching (e.g., at a high enough rate, such as 120 Hz, to avoid flicker) is employed (and a viewer perceives content from both layers as being output concurrently or as one dimensional image). In other words, FIG. 4A provides a first snapshot or freeze frame of the display system 400A at a first operating state and a second snapshot or freeze frame of the display system 400B at a second operating state. A display controller (not shown) alternates or switches 450, 451 rapidly (such as at a rate of up to 240 Hz or higher) between these two states 400A, 400B to provide the display system 400 shown in FIG. 4B.

The inventors recognized that the front layer content 416 can be made opaque and high contrast (white to black luminance levels) making it independent of the background content (e.g., not only high contrast on black back layer content). In the first state of operations of system 400A (after switching 451 by a display controller (not shown), the back layer display device 420A displays content (dark content 422 and brighter content/images 424) in its panel/screen while the front layer display device 410A is concurrently operated to be transparent in a first region or area 412 of its screen/panel but also to display a mask 413 (e.g., white pixels where transparent, black where opaque (masking), and, in some cases, gray where it is desirable for panel/screen to be semi-transparent)). In this first operating state of system 400A, the back layer content 424 is occluded in areas covered or associated with the front layer mask 413, and this can be seen in FIG. 4B where not only region or portion 418 over the black region 422 is high contrast but so is the portion or region 419 over the brighter back layer content 424.

In the second state of operations of system 400B (after switching 450 is performed by a display controller), the displays 410B, 420B switch, and the back layer display device 420B displays white 426 and the front layer display device 410B concurrently displays its content (dark regions 414 along with brighter pixels/imagery 416 (e.g., a fish)) in its panel/screen. The back layer display device 420B with its white screen 426 acts as a backlight for the front layer 410B, making the front layer content 416 visible to an observer as shown in FIG. 4B.

The front layer mask 413 displayed in the first operating state of front layer display device 410A blocks the background content that is mapped to the front layer content (or a particular object or image in such content) 416, which makes the front content appear opaque as shown at 418 and, more particularly, at 419 in FIG. 4B. The front layer mask 413 provides a black dark level for the front layer content 416, when it becomes visible in operating state 400B of the display system, which makes the front content 416 high-contrast. The front layer content 416 and mask 413 are generated on the same display device 410 so that they always are aligned and no monitors or displays have to be calibrated to each other in the display system 400.

For two discrete layers (such as layer 410 and layer 420), the time multiplexing, provided by switching 450, 451 by a display controller, of content and backlight/transparency provides two independent layers of high contrast 2D content with variable opacity of the front layer (e.g., mask 413 may be black for full opacity to gray to provide a less opaque effect) and with the content being viewable over a wide field of view. Disocclusion of the back layer content 424 is possible with the mask 413 as a viewer changes their viewpoint relative to the display system 400.

When LCD panels are used for the display devices 410, 420, it should be remembered that LCD panels should be selected that provide response times less than 10 ms so that each sequential frame has a clean, complete image. LCDs typically scan their image from top to bottom. At some instances in time, two sequential frames are displayed simultaneously. For displays with slower response times, there are always two sequential images on the screen at the same time. This may make the mask 413 ineffectual and make the images lower contrast. Hence, displays with faster response times are typically preferred for a display system 400 as there are periods where only one image appears.

During operations of the system 400, switching or alternating occurs 450, 451 between front layer content 416 with back layer backlight 426 and front layer mask 413 with back layer content 422, 424. The front layer is, thus, independent of the back layer content 422, 424. The front content/image(s) 416 appears (as shown at 418) over dark background content 422 and also appears (as shown at 419) to be opaque and high contrast over bright background content 424.

The inventors implemented a display system with a foreground mask by using the prototype/implementations described above but with a change to the content provided to the front layer display device or transparent, 3D capable television. Specifically, in addition to CG prerendering foreground content (e.g., a swimming koi) and background content (e.g., rock bottom in body of water), a foreground mask was CG rendered at 1280 by 720 resolution (same resolution as other content) that was mapped in size, shape, and location to the foreground content (e.g., a black silhouette of the swimming koi in this case).

Then, within the movie or when the movie was played by the system, for one or a first frame, the left side of the double wide image contained the foreground content or image (e.g., see content 414 and 416 in FIG. 4A) and the right side contained a white blank field (e.g., see back layer content 426 in FIG. 4A). The back television displayed the white image so as to act as a backlight for the transparent front television displaying the foreground content (with fish/image 416). For the next frame, the left side of the double wide image contained the foreground mask (see display 410A in FIG. 4A with white/clear content 412 about dark content/object or the mask 413) and the right side contained the background content (see content 424 in FIG. 4A providing lighter/colored rocks).

The front television displayed the mask image with the white areas of the mask being transparent to the back television that was displaying the background or back layer content. The black areas of the mask (silhouette 413 in FIG. 4A) blocked the view of the background image in the paired or mapped portions of the back layer content. The two frames were then repeatedly alternated at 120 Hz to provide a dual layer or 3D display or visual effect. The front and back layers were independent, and the front layer content appeared opaque and high contrast as it also acted to occlude background content.

The results of implementing such a display system with the inclusion of the dynamic mask showed that the white body of the koi (foreground image, content, or object) appears over the dark background and also appears opaque and high contrast over the light background. Because the front display device alternates between the content and the mask, the content being masked and the mask always are properly aligned. The foreground content is visible and occludes the background even when viewed far off-axis. The foreground content and mask do not depend upon the background content (other than the blank white backlight frame). Therefore, the front and back display devices do not need to be carefully aligned or calibrated to each other. Disocclusion of the back layer occurs naturally with changing viewpoint, without the need for view tracking.

The switching dual layer display systems may be operated, such as via programming or code in the display control program or module 240 of system 200 in FIG. 2, to provide opacity depth blending. For a 3D object whose thickness spans both (or more) layers of a display system, the object (without opacity depth blending) would appear to be separated into two cross sections, with one section being on each of the two layers associated with the display screens of the two display devices. However, using depth-weighted blending, the 3D object may be made to appear to be continuous in depth, but it would be viewable over a reduced field of view.

To this end, the display system may be configured to place virtual pixels at depths between the layers to increase the apparent number of layers. This involves splitting the virtual pixel's luminance between the front and back layer display devices such as proportional to the virtual pixel's depth. This technique is sometimes described as providing depth anti-aliasing in the depth cube and in depth fusion in depth-fused displays. The switching dual layer display systems of the present description may be adapted so as to be capable of splitting the luminance between the switched front and back layer content so as to achieve depth-weighted blending.

The switching dual layer display system may also be operated to use the mask with the switched content to achieve a different mechanism for blending the layers in depth. Both the opacity and luminance of the foreground pixels may be modulated based on depth, while the corresponding background pixels may remain (or be kept set at) full luminance. The result is a selective combination of multiplicative and additive blending. The semi-transparent mask (e.g., mask 413 in display device 410A) multiplicatively attenuates the background pixels (in the region of content 424 in display 420B mapped to or corresponding to mask 413), which are then additively blended with the foreground pixels. Unlike other forms of depth-weighted blending, a pixel located at the front layer will be opaque and fully bright regardless of the viewing angle used to view the display system.

To implement a switching dual layer display system with opacity depth blending, the setup of the switching dual layer display discussed above with regard to a specific implementation or prototype may be retained or reused but, as with providing a mask, the content provided to the two LCDs may be modified or changed. Particularly, a color image and aligned 11-bit depth map of an object (i.e., a teddy bear) was acquired using a Microsoft® Kinect™. The depth map was scaled and biased so that the adjusted depth range spanned the depth of the visible portions of the object (teddy bear). The resulting adjusted depth map was encoded into an 8-bit grayscale image with white being nearest and black being farthest away from a viewer.

The foreground content image was computed by multiplying the color image with the adjusted depth map image. The foreground image mask was chosen to be the inverted adjusted depth map image, with the mask being grayscale so as to exhibit partial transparency. The background content image was chosen to be the color image of the object (teddy bear). The three images and fourth blank image were tiled into a movie (again using Adobe@ Premier@). For example, the upper left quadrant contained the foreground content image, the lower right quadrant contained the background content image, the lower left quadrant contained the foreground mask, and the remaining quadrant was blank white.

The resulting movie was played (again, using Bino), which involved taking the over-under double-wide 3D movie and converting it to a quad-buffered frame-sequential double wide movie that could then be output across the two televisions. The front layer content was positioned so it aligned with the back layer content when viewed on-axis. For one frame, the left side of the double wide image contained the foreground content and the right side contained a white blank field. The back television then displayed the white image, acting as the backlight for the transparent front television that was displaying the foreground content. For the next frame, the left side of the double wide image contained the foreground mask and the right side contained the background content. The front television, thus, displayed the mask image with the white areas of the mask being transparent to the back television as it displayed the background content and the black areas of the mask acting to block the view of the background image. The two frames were repeatedly alternated at 120 Hz.

With regard to achieved results, using opacity depth blending and when viewed from approximately twelve feet away, the displayed content (i.e., a teddy bear in the example implementation) appeared to contiguously and smoothly span the depth/space between the front and rear display devices. The effect appears similar to depth fusion or depth anti-aliasing when viewed on-axis. When viewed off-axis, the layers become misaligned, the bear becomes blurry, and then it looks similar to a multiplanar image because of the variable opacity. A typical depth-fused image viewed off-axis appears blurry then breaks down into a double image. With opacity depth blending, the displayed content (e.g., the teddy bear's nose), which is located near the front layer, is black and opaque. In a depth-fused display, the same black nose (or other portion of the content) appears as a hole in the front layer, and, in off-axis, the back layers would quickly appear through the hole. Techniques to increase the field of view of depth fused images may also be used to increase the field of view of an opacity depth blended image. These techniques include temporally switched directional backlights (e.g., alternating edge lit prism films or scanning lenticular backlights) with synchronized multi-view background and foreground content, and coarse integral optics (to optically angularly multiplex an array of dual layer views) so that the foreground and background content are aligned in each view zone.

Figure 5A:
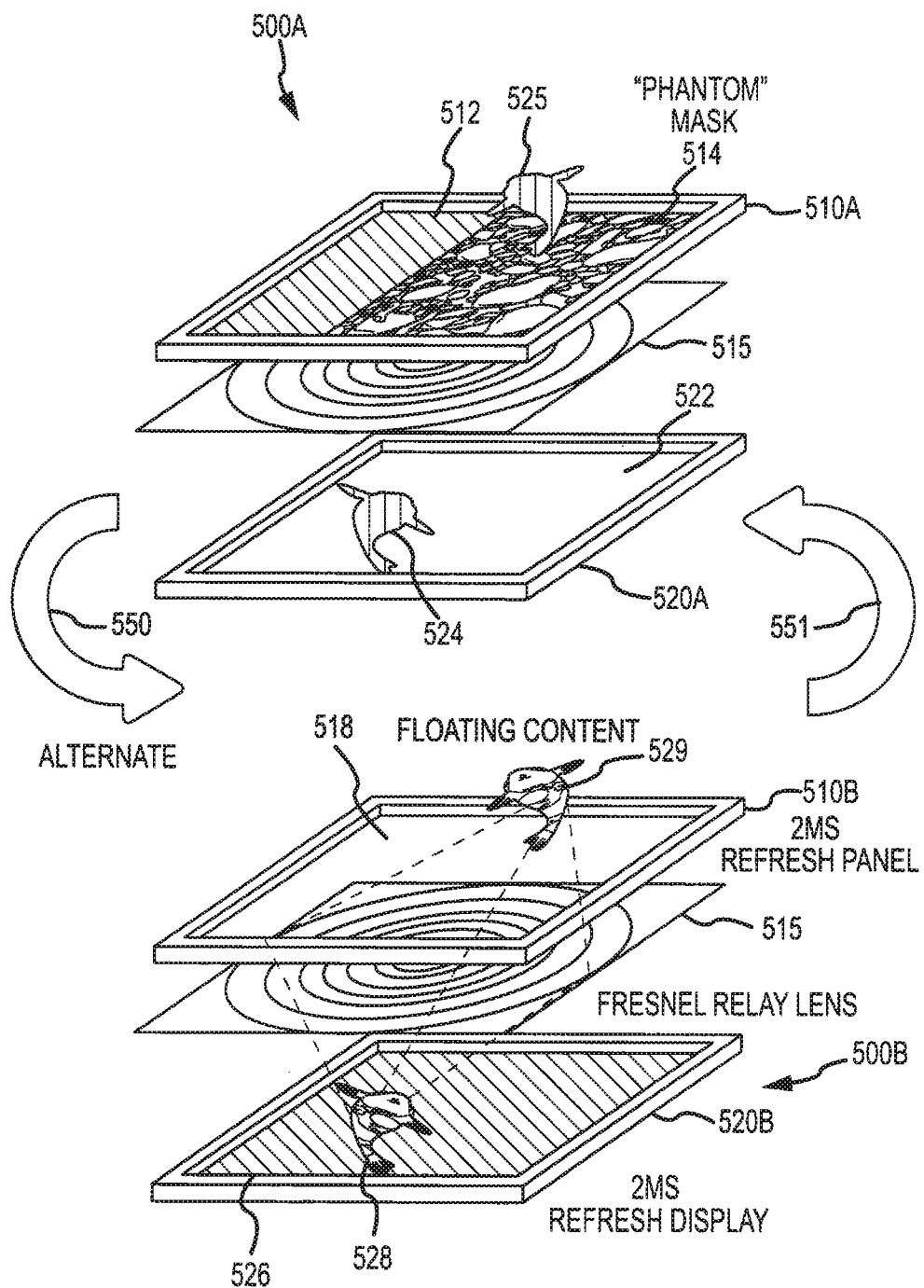
FIGS. 5A and 5B are perspective views of a floating switching dual layer display system during switching operations and during interaction by a user/viewer.
Figure 5B:
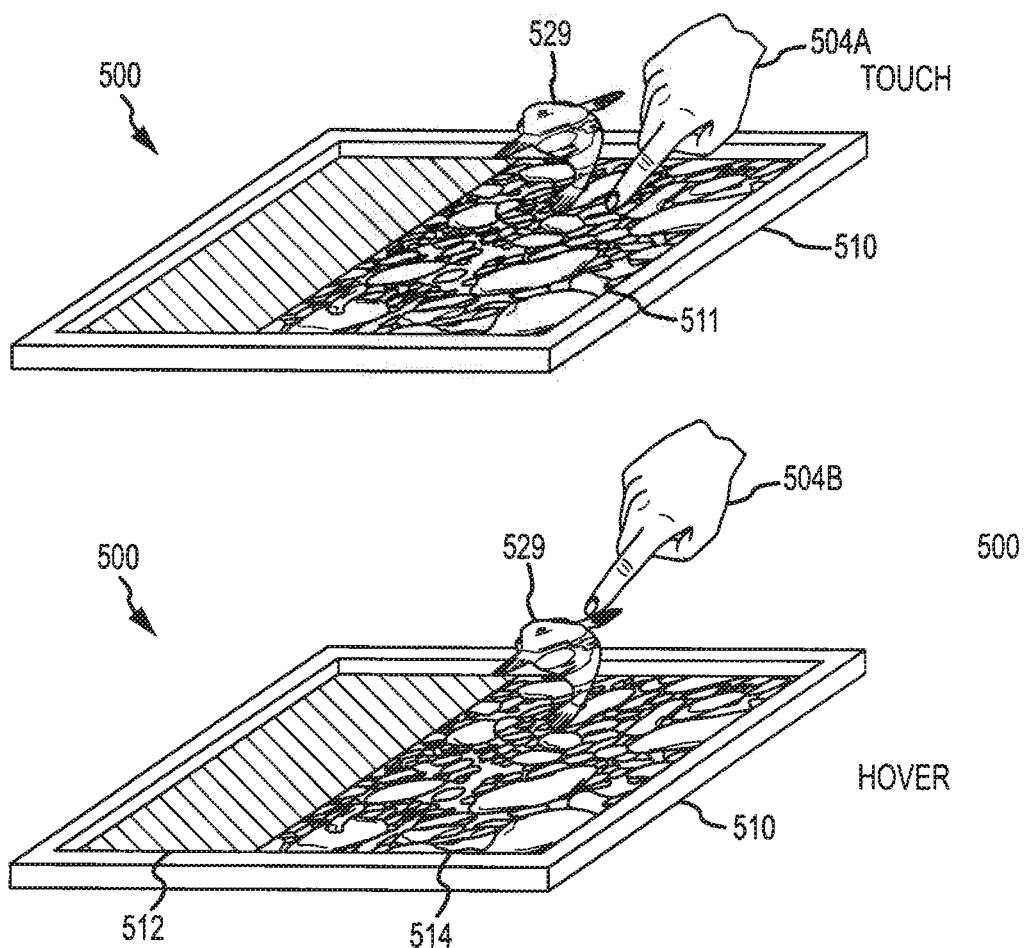

In some cases, it may be desirable to provide real images with a switching dual layer display system such as by making one layer float above the other such that viewers may pass their hands (or otherwise interact) through the floating layer to touch the layer behind it (lower layer content). FIG. 5A illustrates a dual layer display system 500A and 500B during switching of its operational state (first state shown at 500A and second state shown at 500B), and FIG. 5B shows a view of the dual layer display system 500 (of FIG. 5A) when rapid switching (e.g., at a high enough rate, such as 2 ms refresh, to avoid flicker) is employed and a viewer is allowed to interact with the real, floating image/content. In other words, FIG. 5A provides a first snapshot or freeze frame of the display system 500A at a first operating state and a second snapshot or freeze frame of the display system 500B at a second operating state. A display controller (not shown) alternates or switches 550, 551 rapidly (such as at a rate of up to 240 Hz or higher) between these two states 500A, 500B to provide the interactive display system 500 shown in FIG. 5B.

As shown in FIG. 5B during operation of the system 500, one layer's content 529 floats a distance above the other layer's content 512, 514 (and display screen/panel surface 511), and a viewer/user may interact as shown at 504B with the hovering content 529 or pass through this content 529 to touch the lower layer content 514 on screen/panel 511. This allows users to interact with the entire volume rather than just the front surface.

To accomplish or provide such an interactive dimensional display, the system 500 may include two stacked and spaced-apart display devices 510, 520 that are used with relay optics 515 (e.g., spherical lens, a Fresnel lens, a concave mirror, a dihedral mirror array, a dual fly-eye array, a retroreflector and beamsplitter, or the like) positioned between the display devices 510, 520. In a first state after switching 550 as shown at 500B, the relayed or lower display device 520B is operated by a display controller to display foreground content (dark regions 526 and light/colored objects/images 528 (here a swimming koi)) while the transparent or upper display device 510B is operated to be clear/transparent (display white) as shown at 518. The lens/relay optics 515 relays the image of the rear display 520B through the clear transparent display 510B. As a result, the viewer sees a floating real image 529 of the related display 520B with foreground content 528 a distance in front of the transparent display screen/panel surface 511.

In the second state after switching 551 as shown at 500A, the relayed display device 520A is operated to show or display a mask (dark/black regions) 524 over a white field 522, and the transparent display device 510A shows the background content 512, 514. The white field 522 in lower or relay display device 520A acts as a backlight for the transparent display device 510A so that the transparent display's image (i.e., the background content 512, 514) can be seen by a viewer of system 500. The black mask 524 is relayed through and in front of the transparent display 510 or its screen 511 by the relay optics 515, e.g., appearing as an opaque floating "phantom" mask 525 (a black object) above the background content 514. The viewer 504A, 504B may look around the phantom mask 525 to see the background 514 but not through the phantom mask 525.

From any viewpoint in which a ray passes from the eye through the phantom mask 525 and through a point on the background content 514, the ray will land on the mask 524 on the relayed display 520A. No light will illuminate the background content 514 for that position and viewing angle. From a different viewing angle for a ray that does not pass through the phantom mask 525, the ray passes through the point on the background content 514 and will land on white content 522 on the relayed display device 520A. The background content 514 will be backlit and visible for that position and viewing angle. Note, the same point on the background content 514 may be visible from one viewpoint but not from another viewpoint.

The phantom 525 acts as a mask for the floating color content 529. It blocks the background content 514 (being shown on transparent display 510A) making the foreground content 528 opaque. The phantom mask 525 also acts as an aligned black silhouette to increase the contrast of the foreground content 528 as it is viewed as floating content/object 529. The user can accommodate/focus on either the floating layer 529 or on the background content 514 on display screen/surface 511. The foreground content 528 and its mask 524 are generated on the same relayed display 520 and pass through the same optics 515 such that they are always aligned even in the presence of optical distortion from lenses or mirrors.

As with the other embodiments, the inventors implemented or prototyped a floating, switching dual layer display system with a phantom mask. The prototype was constructed with a 36-inch diameter, 15-inch focal length concave mirror as the relay optics and with two 23-inch 3D capable monitors (i.e., the Samsung® S23A950D) with 2 ms response time. For ease of construction, the concave mirror was placed on the floor with its mirrored concave side facing upwards. One monitor was placed 30 inches above the vertex of the mirror and off-axis so that its 1:1 relayed real image was also 30 inches above the vertex of the mirror and on the opposite side of the mirror's optical axis. The other monitor was made into a transparent display by removing its backlight and anti-glare film. The transparent monitor was arbitrarily placed 7 inches below the real image of the other monitor that was being relayed in the concave mirror. Both monitors were then set to frame sequential 3D mode and to accept 720 p, 120 Hz, HDMI video inputs.

Floating foreground imagery or content (e.g., a swimming koi), a matching foreground mask (e.g., a black silhouette of the same swimming koi with like size, shape, and orientation), and background imagery or content (e.g., a rock bottom) were CO prerendered separately each at 1280 by 720 resolution. The three images and a fourth blank image were then tiled into a movie. The upper left quadrant contained the floating foreground image/movie, the lower right quadrant contained the background image/movie, the lower left quadrant contained the foreground mask image/movie, and the remaining quadrant was blank white. The resulting movie was played (e.g., using Bino), converting the over-under double-wide 3D movie into a quad-buffered frame-sequential double wide movie that was output across the two monitors, with the left side displayed on the relayed or back monitor and the right side displayed on the transparent or front monitor.

For one frame, the left side of the double wide image contained the foreground content and the right side contained a white blank field. The relayed monitor thus displayed the foreground content and the transparent monitor was transparent to allow the relayed real image to pass through it and float in space in front of or above the transparent monitor screen/panel. For the next frame, the left side of the double wide image contained the foreground mask on a white background and the right side contained background content. As a result, the relayed monitor content displayed the mask image on the white background acting as a selective backlight for the transparent monitor as it displayed background content. The two frames were repeatedly alternated at 120 Hz.

As with the other implementations/prototypes, it may be useful to discuss the results achieved with such a floating, switching dual layer display system with a phantom mask. Using the relay mirror and phantom mask with the switching dual layer display system, the front layer is opaque and high contrast as it floats above the solid appearing background layer content. The front layer content floats (e.g., 7 inches out) above the back layer content. The floating image is opaque and occludes the background, but the background can be revealed by shifting the point of view. Even with the back layer at arm's reach, the user can easily and naturally focus and verge on either front or back layer content. The user may also pass his/her hand through the opaque floating layer content to touch the back layer content (or the screen upon which it is displayed).

The mirror was placed on the floor with its optical axis pointing upward, which resulted in a table-top dual layer display. The display is viewable from all sides; however, there is one preferential side due to the arrangement of the monitors. When using a spherical mirror, relaying the image on-axis results in less aberration than relaying the image off-axis. The relayed monitor is placed on-axis horizontally and off-axis vertically so that there is less aberration in the horizontal direction. The viewer's eyes are naturally arranged horizontally for stereo vision so there is less visible aberration when the display is viewed from the side in which the monitors are in this arrangement. This aberration is mainly field curvature, e.g., the relayed image of the flat monitor forms on a slight bowl-shaped surface concentric with the mirror. However, the relayed monitor is situated horizontally on-axis but vertically off-axis such that the front image content lies on a portion of a spherical quadrant. Although there is field curvature in the front layer image and none in the back layer content (because it is viewed directly on a flat transparent LCD), the front layer content and mask are always aligned because they are generated on the same monitor and pass through the same optical path.

The relayed image also looks more planar and parallel to the rear display near the top center portion of the front floating display. Restricting floating content to be located over this portion of the display would reduce the effects of curvature and vignetting. Without adding additional optics, the field curvature can be reduced by increasing the focal length of the mirror (but at the expense of increasing the overall size of the display system). A mirror was chosen for the implementation as the relay optic because glass lenses with large diameters were heavy and could not be easily obtained. Fresnel lenses suffered from scattering and chromatic aberrations leading to lower contrast and more blurry images. Other optical systems may be useful, too, such as a birdbath optical relay, to relay the image on-axis so there are less visible effects of curvature but with reduced luminance. The birdbath optical relay could be used vertically or horizontally (e.g., tabletop dual layer display) and with less aberration and no preferential side as the off-axis mirror relayed version.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the above description provided detailed implementations for dual layer display systems, but it will be understood by those skilled in the arts that the inventors' teaching can readily be expanded to provide a switching multilayer display system. If opacity depth blending is provided, it may involve modulating the front layer's opacity (via the LCD mask) and luminance (via the transparent LCD) based on the virtual pixel's depth (from a depth map).

Particularly, multiple monitors may be stacked and spaced apart from each other to produce a switching multilayer display system when controlled (as discussed above with a display controller to switch particular content that may include masks). This configuration allows for multiple planes of content to be displayed or more depth-weighted, blended levels with a larger field-of-view. The switching sequence of content, backlighting, and masks would be such that each layer is backlit in turn and has appropriate masks in front of it.

In one implementation, for example but not as a limitation to multilayer display systems, a switching three layer display system with foreground, mid-ground, and background layers would require a three state switching sequence. In the first state, the back layer displays content and the middle and foreground layers are masks (displaying white where transparent and gray or black where providing masks). The viewer sees the back layer content masked by the middle and front layer masks. In the second state, the displays switch and the back layer displays white and the middle layer displays its content while the front layer displays its mask. The back layer acts as a backlight for the middle layer and the front layer's mask occludes the middle layer. In the third state, the back and middle layer display white, and the front layer displays its content. The back layer acts as a backlight for the front layer, the middle layer is transparent allowing the backlight from the back layer to illuminate the front layer content. The sequence is then repeated quickly enough that the viewer perceives a single combined image.

Since the display is time multiplexed, the time to display an entire sequence would increase linearly with the number of layers. For a three layer display system using monitors driven at 120 Hz (for example), the entire sequence would be repeated forty times a second to provide little or no flicker. When color filters are included/used, the layers' images would be attenuated as they pass through multiple layers.

Although the presented content in some prototypes was prerendered, formatted, and played back using the Bino stereoscopic movie player, the present description is not limited to such content. For example, real time content may be (and has been by the inventors) rendered and displayed on any of the embodiments of the switching dual layer displays system. For example, generally, standard rendering and tiling of color foreground content, a foreground mask, and background content can be used to operate the display system, without the need for further intensive computations/processing. Further, although quad-buffering may be desirable to ensure flicker-free display output regardless of rendering update rates, frame sequential switching of content and mask/backlight has been used by the inventors to implement the switching dual layer display system. Flicker and flashing may occur if the rendering frame rate is not maintained at or above about 120 Hz.

The floating switching dual layer display embodiments allow a user to pass their hands (or other objects) through the front floating layer content to touch or interact with the back layer content (screen of the top display device). Because all the front imagery is being relayed through the back layer (e.g., the transparent front or top display device), when the user's hand (or other interactive object) passes beyond the front image plane, the associated light is blocked by their hand and the front image disappears rather than appearing to float over the user's hand.

To address this issue, the display system may further include a projector (e.g., placed above or behind the user) to project the image of the front layer content onto the back of the user's hand when their hand is past the front image plane and blocking the front layer image/content. Although that portion of the front image content will not be floating in space, it will give an impression that the front image content has collapsed onto their hand, rather than being blocked by it. To sense the user's hand (or interactive object) position, a Microsoft® Kinect® or other depth sensitive camera/sensor may be included in the display system (or the system may use a simple beam-break since the projection only occurs after the user has passed the front image plane). The projection may also be interactive, such as taking an object off the front layer, carrying it on the back of the hand (or paddle or other interactive object), and placing it on the back layer (or vice versa).

Due to parallax, for large off angle viewing, front content may appear beyond the edge of the rear display. To produce a large field of view of the dual layer content, the rear display should be made larger than the front display and/or the distance between the transparent and rear display should be small.

To make a wide field of view dual layer display with a large separation between foreground and background content, the rear display may be a projection onto a blank wall (curved or flat). The projection would switch synchronously with the transparent LCD front display (either a 120 Hz projector or using two projectors (one content/one white) with synchronized alternating shutters). Synchronization can be off the video's vsync or with a photo-emitter/detector pair across the transparent LCD and a displayed alternating clear/opaque square. The projection would be white when the transparent LCD is display foreground content; the projection acting as a white backlight for the transparent LCD. The projection would display background content, while the transparent LCD displays a black (or semi-opaque) mask, occluding (or partially occluding) the background content. The background screen can be textured (with image) surface, and the projector projects its complimentary image so the background surface appears plain.

Real physical 3D objects (with switchable projected textures) may be placed between the foreground and background content to increase the sense of depth and space. These objects would likely be white without texture and lit with white light, when the rear projection is white, so that these objects would also act as a diffuse backlight for the foreground content on the transparent LCD. When the background is displaying its content (and the transparent display is displaying its mask), color and texture could be projected onto the 3D objects between the rear projection and transparent display. Care preferably would be taken to evenly illuminate the 3D objects and background when they are white to prevent or limit any shadows or apparent surface features. Further, the color projection may be adapted to cover the object and background without the object blocking the rear projection content or parts of the object self-shadowing or blocking the projection of its own color or texture. Multiple projectors may be required or at least desirable in some cases.

The entire rear content may also be a physical scene or set. In such an implementation, the second layer of the dual layer display may be a switchable scattering/transparent surface, acting as a switchable transparent backlight, behind the front transparent LCD. Current state of the art transparent backlights include an edge-lit particle embedded plastic sheet or an edge-lit (scattering) liquid crystal panel (aka smart glass) These backlights may provide illumination for the transparent LCD panel but may not be able to provide the opacity and black level without switching. The edge-lit particle embedded plastic sheet may make distant objects diffuse and blurry.

Rather than edge lighting the scattering liquid crystal panel, since space is not an issue, the smart glass panel can be made scattering and flood illuminated with a projector/flood light (or ambient outdoor light) when the transparent LCD is displaying its content (allowing the front content to be seen). Then, the smart glass may be made transparent while the transparent LCD panel is displaying its mask (allowing the physical background to be seen). These would be switched at 120 Hz or the like (e.g., using polymer stabilized cholesteric textured liquid crystal panels (PSCT-LC) from LC-TEC or the like) so that flicker in the foreground content and of the background would not be apparent.

Further with regard to the floating dual layer display system, when the monitor that displays the floating layer content is tilted, the relayed "front" floating layer will appear to be at an angle to the second "back" monitor. If the mirror is rotated appropriately, it is possible to have the front floating layer content perpendicular to the back monitor. For example, it would then appear as if a flat, upright character (or other content) is walking (or otherwise moving) along a flat surface. In other words, the two display devices clearly do not need to be parallel to each other to practice the present description.

There are also two 3D additional embodiments that should be discussed in this description: one with glasses and one that provides autostereo with directional backlighting. With regard to the glasses embodiment, 3D displays are provided employing shutter glasses, color filters (anaglyph), or polarization provide stereo vision by providing different right/left eye views. Eyes toe-in ("verge") at virtual 3D position in space to align left and right eye views, so the mind perceives a 3D image. The eyes also naturally focus at a plane of vergence. These 3D displays do not provide correct focus cues (accommodation). Focus is always at the screen.

However, the inventors recognized that one can combine stereo 3D displays with dual layer display to provide stereo and accommodation cues for comfortable natural 3D. A simple example would combine anaglyph (left eye image (red), right eye image (amber), left eye lens (amber filter/red pass), right eye lens (red filter/amber pass)) and a dual layer display. Deep objects would be displayed as an anaglyph image on the back layer (so the eye focuses at far layer and objects appear dimensional/rounded due to anaglyph image). Near objects would be displayed as an anaglyph image on the front layer (so the eye focuses at near layer and near objects appear dimensional/rounded due to anaglyph image).

With regard to an autostereo with directional backlight implementation, it was recognized by the inventors that one can use a directional backlight and the stack of transparent displays. For example, the backlight can emit nearly collimated light selectively in one of three directions (right, front, left) (e.g., as is done with lenticulars or micro-prism films). This directional backlight is directly behind the back display (which is now just a transparent display) and spaced behind the front display. One can compute what the front content, the mask, and the back content would look like from the right view, middle view and left view. For planar objects all three views would look the same. For 3-D objects that are located at the front and back plane, their R/M/L, views and masks would look different.

Then, the display system may further be designed such to have the directional backlight shine only in the right direction. First, the back layer is white/transparent, the front layer is front right-view content. Then, the back layer is back right-view content, and the front layer is front right-view mask. Then, the directional backlight may be operated to shine only in the middle direction. First, the back layer is white/transparent, the front layer is front middle-view content. Then, the back layer is back middle-view content, and the front layer is front middle-view mask. Next, the directional backlight is operated to shine only in the left direction. First, the back layer is white/transparent, the front layer is front left-view content. Then, the back layer is back left-view content, and the front layer is front left-view mask. During system operations, the cycle repeats.

The viewer's eye would be in two different view zones, such that they would see two different image stacks. This would allow the display system to be configured to provide a view-dependent dual layer display, providing not only layered 3D stereoscopic views (for accommodation and 3D stereo) but also view-dependent lighting effects like specular reflections. It will be understood that the display system could include more levels and more backlight directions, which would increase the time to complete one image stack. Opacity depth blending could be used to create view-appropriate volumetric images between the two displays, for each of the L/M/R view zones. The viewer's eyes would not need to be in different view zones to perceive three dimensional imagery, and, within each view zone, the three dimensional imagery would still exhibit correct parallax and accommodation/vergence cues. Normally, depth-blended images are only viewable over a small field of view, due to the front and back layers becoming increasingly misaligned. The multiple view zones created by directional backlight increase the field of view of the opacity depth blended images by realigning the front and back layer content with updated view information for each view zone.

We claim:

1. A switching dual layer display system for providing a dimensional display, comprising:
   a first display device;
   a second display device with a light source, the second display device being arranged to be spaced apart from the first display device and to project output light onto a back surface of the first display device; and
   a display controller first operating the first and second display devices in a first mode in which the first display device is transparent and the second display device displays back layer content and second operating the first and second display devices in a second mode in which the first display device displays front layer content and the second display device operates as a backlight to the first display device,
   wherein in the first mode the first display device displays a mask comprising a white region and a gray-to-black region mapped to an object in the front layer content displayed during the second mode.

2. The system of claim 1, wherein the first display device is a transparent liquid crystal display (LCD) and the second display device is an LCD monitor.

3. The system of claim 1, wherein the display controller switches between the first and second operating modes in a synchronized manner and at a rate whereby the first layer content and the back layer content are each displayed at least at 60 Hz.

4. The system of claim 1, wherein the back layer content of the second display device comprises a colored object and the mask of the first display device is transparent to the colored object in the white region and is semi-transparent-to-opaque to the colored object in the gray-to-black region.

5. The system of claim 1, wherein the mask of the first display device comprises a plurality of black pixels in the gray-to-black region, whereby the mask occludes light from the back layer content of the second display device with the gray-to-black region.

6. The system of claim 1, wherein the second display device comprises a projector.

7. The system of claim 1, wherein the second display device comprises a switchable transparent backlight.

8. The system of claim 7, wherein the switchable transparent backlight comprises at least one of edge-lit plastic, an LCD, and an area-flooded smart glass.

9. The system of claim 1, wherein the front layer content includes a first anaglyph image for a first one of the left or right eye and the back layer content includes a second anaglyph image for a second one of the left or right eye.

10. The system of claim 1, wherein the second display device includes a transmissive display and the light source comprises a directional backlight providing substantially collimated light sequentially in one of three directions to sequentially illuminate three areas of the first display device and the transmissive display of the second display device.

11. The system of claim 10, wherein the system is selectively operated to provide two or more view zones.

12. The system of claim 10, wherein the system is selectively operated to provide opacity depth blending to increase the field of view.

13. A display system providing floating content, comprising:
    a transparent display device;
    a relayed display device spaced apart from the transparent display device; and
    relay optics positioned between the transparent display device and the relayed display device,
    wherein the transparent display device operates in a first operating state in response to first control signals to display white to be transparent to light from the relayed display device and the relayed display device concurrently operates to display foreground content,
    wherein the transparent display device operates in a second operating state in response to second control signals to display background content and the relayed display device concurrently operates to display a mask corresponding with the foreground content, and
    wherein the relay optics display the foreground content as a real image in a plane that is a distance from a first side of the transparent display device, the first side being opposite a second side of the transparent display device that faces the relayed display device.

14. The system of claim 13, wherein the transparent display device comprises a transparent liquid crystal display (LCD) and the second display device comprises an LCD monitor.

15. The system of claim 13, wherein the relay optics comprise a concave mirror, a Fresnel lens, a concave mirror with a beamsplitter, a dihedral mirror array, a double fly-eye array, or a retroreflector with a beamsplitter.

16. The system of claim 13, further including a display controller switching the display system between the first and second operating states at 60 Hz or faster by providing the first and second control signals.

17. The system of claim 13, further including a sensor sensing interaction with a floating image associated with the foreground content at a distance from the transparent display device and a projector operable in response to the sensed interaction to project the foreground content toward the transparent display device.

18. The system of claim 17, wherein the sensor comprises an IR depth camera monitoring the sensed interaction through the transparent display device and wherein the transparent display device comprises an LCD.

19. A dimensional display apparatus, comprising:
an LCD monitor;
a transparent LCD panel spaced apart a distance from a display screen from the LCD monitor; and
a display controller controlling operations of the LCD monitor and the transparent LCD panel to alternate between first and second operating states,
wherein, in the first operating state, the transparent LCD panel displays blank white and the LCD monitor displays back layer images,
wherein, in the second operating state, the transparent LCD panel displays front layer images and the LCD monitor displays blank white, whereby the LCD monitor acts as a backlight for the transparent LCD panel in the second operating state, and
wherein, in the first operating state, the transparent LCD panel further displays a mask for at least one of the front layer images, the mask blocking light at least a portion of light from the LCD monitor and the mask being sized, shaped, and positioned based on a size, shape, and position of the at least one of the front layer images.

20. The apparatus of claim 19, wherein the alternating between the first and second operating states occurs at least at 60 Hz.

21. The apparatus of claim 20, wherein the alternating between the first and second operating states for the transparent LCD panel and the LCD monitor is synchronized by the display controller.

22. The apparatus of claim 19, wherein the LCD monitor and the transparent LCD panel are stacked and the distance is at least about 1 inch.

23. The apparatus of claim 19, wherein the mask comprises a plurality of gray scale pixels.

24. The apparatus of claim 19, wherein the mask comprises a plurality of black pixels.

25. The apparatus of claim 19, wherein the at least one of the front layer images is defined by an outer boundary and wherein the mask is defined with an outer boundary matching the outer boundary of the at least one of the front layer images that is aligned with the at least one of the front layer images.

26. The apparatus of claim 19, wherein display controller operates the transparent LCD panel and the LCD monitor to provide opacity depth blending for a 3D object in the front layer images and in the back layer images having a section on a plane coinciding with the transparent LCD panel and a section on a plane coinciding with the LCD monitor.

27. The display system of claim 13, wherein the foreground content includes a foreground image, wherein the mask includes a phantom mask portion that displays gray-to-black within the foreground content so as to block light associated with the background content that is concurrently displayed by the transparent display device, and wherein the phantom mask portion displayed during the second operating state has a shape and a size corresponding to the foreground image displayed during the first operating state.

28. The display system of claim 13, further comprising memory storing the foreground content and the background content.

* * * * *

UNITED STATES PATENT AND TRADEMARK OFFICE
CERTIFICATE OF CORRECTION

PATENT NO. : 8,976,323 B2  
APPLICATION NO. : 13/775368  
DATED : March 10, 2015  
INVENTOR(S) : Quinn Y. Smithwick et al.

Page 1 of 1

It is certified that error appears in the above-identified patent and that said Letters Patent is hereby corrected as shown below:

In The Claims

Column 3, line 57, delete "hack" and insert therefor --back--.

Column 10, line 52, delete "hack" and insert therefor --back--.

Signed and Sealed this  
Thirtieth Day of June, 2015

Michelle K. Lee  
*Director of the United States Patent and Trademark Office*